3,455,706
GLASS CERAMIC PRODUCT AND METHOD FOR MAKING SAME
Kiyoshi Takagi and Masamichi Wada, Otzu, Japan, assignors, by mesne assignments, to Owens-Illinois, Inc., a corporation of Ohio
No Drawing. Filed June 22, 1964, Ser. No. 377,100
Claims priority, application Japan, June 26, 1963, 38/32,882
Int. Cl. C03c *3/22;* C03b *31/00*
U.S. Cl. 106—39                              18 Claims

ABSTRACT OF THE DISCLOSURE

A new thermally crystallizable glass composition of which at least 90% by weight consists essentially of five ingredients on specified weight percentages, namely, 35–50% $SiO_2$, 20–35% $Al_2O_3$, 10–25% $Na_2O$, 3–12% MgO and 2–6% $ZrO_2$. Up to 4% $K_2O$ may also be present in the glass but then the total amount of $Na_2O$ plus $K_2O$ is within the range of 10–25%. Thermally crystallized glass ceramics are made from the aforesaid glass composition and the process for heat treating the shaped thermally crystallizable glasses to form the glass ceramics is set forth.

---

This invention relates to a new method of producing a ceramic body from a glass body wherein the ceramic body has a fine crystalline structure, and also has a mechanical strength and a deformation temperature which are higher than that of the original glass. The method is effected by reheating glass which contains $ZrO_2$, MgO, $SiO_2$, $Al_2O_3$, $Na_2O$, and $K_2O$ as its main constituents so as to crystallize the glass in a controlled manner.

It has been found that the glass of the particular composition described below, in which $ZrO_2$ is added into an $Na_2O$-$K_2O$-MgO-$Al_2O_3$-$SiO_2$ system as a nucleus-forming agent, could be transformed, by reheating, into a ceramic which has a fine crystalline structure and a deformation temperature higher than that of the original glass, and also has a higher strength.

Methods of producing crystallized glass ceramics using $ZrO_2$ as a nucleus-forming or nucleating agent are described in Japanese patent bulletin 23,866–61 which issued as Japanese Patent No. 311,242 on Oct. 2, 1963, 15,320–62 which issued as Japanese Patent No. 411,762 on Oct. 7, 1963, and 3,912–63 which issued as Japanese Patent No. 411,083 on Sept. 26, 1963. However, all of these methods use expensive lithium compounds as indispensable constituents. In contrast with these methods, the present invention does not use $Li_2O$ as an indispensable constituent, and it is distinguished from the above-mentioned known methods by including a large amount of $Na_2O$ as its indispensable constituent instead of $Li_2O$. Also, in the method described in the Japanese patent bulletin No. 16,976–62 which issued as Japanese Patent No. 406,213 on Apr. 24, 1963, although $ZrO_2$ is used as the nucleating agent, the glass contains $SiO_2$, $Al_2O_3$ and MgO as its main constituents and $Na_2O$ is not its indispensable constituent. In contrast with this, the present invention uses $Na_2O$, $K_2O$, MgO, $Al_2O_3$, and $SiO_2$ as indispensable constituents and aims to obtain a crystallized glass of good quality by using a suitable quantitative combination of these materials.

As known methods of producing crystalline glass which contains $Na_2O$ as an indispensable constituent, there are the methods described in the Japanese patent bulletin 16,032–61 which issued as Japanese Patent No. 290,826 and 1,123–62 which issued as Japanese Patent No. 300,-079. The former uses glass which contains 0.08–0.5% (mol) of $Cr_2O_3$ or contains at least 6% (mol) of titanates of divalent metals as a nucleus-forming agent, and the latter uses glass which contains 0–5% by weight of fluorine as a nucleus-forming agent, and thus both of these methods differ from the method of this invention.

The present invention pertains to a method of producing ceramics from glass wherein the ceramics have deformation or softening temperatures higher than that of the original glass and also have a fine crystalline structure and good strength. Such ceramics are produced by the following procedures.

Glass which contains 2–6% $ZrO_2$, 3–12% MgO, 35–50% $SiO_2$, 20–35% $Al_2O_3$, 10–25% $Na_2O$ and 0–4% $K_2O$ (but $Na_2O+K_2O$ is 10–25%) by weight as its indispensable or essential constituents and in which the total of indispensable constituents amounts to at least 90%, is heated to a temperature higher than its annealing point but lower than its softening point—for example, 700–800° C., to initiate crystallization. The temperature is then raised slowly, for example, at a rate of 5° C./min., to allow further crystallization to proceed, and finally, it is kept for a suitable interval of time at a temperature at which the viscosity of the heated material or body becomes practically infinite due to a precipitation of crystals of oxides which constitute the glass. Such a temperature is preferably within the range of 900–1100° C.

The following compositions, calculated from their batches to the oxide basis in parts by weight, are examples of glasses which are suitable for carrying out the new process.

TABLE

|  | Examples | | | | | |
|---|---|---|---|---|---|---|
|  | 1 | 2 | 3 | 4 | 5 | 6 |
| $SiO_2$ | 43.1 | 43.4 | 43.5 | 43.6 | 43.8 | 43.8 |
| $Al_2O_3$ | 26.7 | 27.0 | 27.0 | 27.1 | 27.2 | 27.2 |
| $Na_2O$ | 16.4 | 16.5 | 14.8 | 16.6 | 16.7 | 16.7 |
| $ZrO_2$ | 3.4 | 4.3 | 4.4 | 3.5 | 4.4 | 4.4 |
| MgO | 10.4 | 8.8 | 8.7 | 7.0 | 5.3 | 5.3 |
| $K_2O$ |  |  | 1.6 |  |  |  |
| FeO |  |  |  | 2.2 |  |  |
| CaO |  |  |  |  | 2.6 |  |
| BaO |  |  |  |  |  | 2.6 |
| Bending strength (kg./cm.²) | 870 | 750 | 1,020 | 905 | 870 | 700 |

A glass batch prepared according to the composition shown in the above table was melted in an electric furnace at 1400–1550 C. for 4–10 hours. Shaped products made from this glass were kept at 800° C. in an electric furnace for 2 hours and then kept at 900° C. in an electric furnace for an additional 2 hours to initiate the crystallization. Then they were further heated up to 1000° C. at a rate of 5° C./min. and then kept at this temperature for 1–4 hours to complete the crystallization. It was confirmed by an X-ray analysis that the main crystalline phase precipitated by such reheating was nephelite. The bending strengths (modulus of rupture) shown in the table were measured by a conventional method, namely, supporting a sample ceramic bar of 50 mm. length by two knife edges placed in parallel and spaced a distance of 30 mm., and then adding weights at the top of the center of the sample midway between the two knife edges until the sample bar breaks.

The reason for limiting the ranges of the amounts of the essential constituents, $ZrO_2$, MgO, $SiO_2$, $Al_2O_3$, $Na_2O$, and $K_2O$, as mentioned above, in this application, is as follows. In order to transform shaped glass products into fine crystallized structures by the above-mentioned heat treatment, it is important to produce many crystal nuclei during the initial stage of the crystallization-heat treatment. It was experimentally ascertained that $ZrO_2$ and MgO play an important role in accelerating the formation of nuclei in a large number in the process of reheating.

When the $ZrO_2$ content is less than 2%, it is hard to obtain a fine crystalline product, and a $ZrO_2$ content of more than 6% makes a crystallized product with reduced mechanical strength. Therefore, the $ZrO_2$ content is limited as 2–6%.

When the MgO content is less than 3%, undissolved substances composed of $ZrO_2$ or its compounds are apt to be produced in the glass melt in the form of a scum, and, when it is greater than 12%, it makes the strength of the crystallized product significantly lower. Therefore, the MgO content is limited to 3–12%.

When the $SiO_2$ content is less than 35%, the liquidus temperature of the glass becomes too high and the melting of the glass is difficult, and, when it is greater than 50%, the crystallization of glass by the reheating becomes difficult. Therefore, the $SiO_2$ content is limited as 35–50%.

When the $Al_2O_3$ content is less than 20%, a crystalline product having a fine texture can hardly be obtained and, when it is greater than 35%, the melting of glass becomes difficult because of the high liquidus temperature. Therefore, the $Al_2O_3$ content is limited as 20–35%.

When the $Na_2O$ content is less than 10%, the melting of glass becomes difficult and, when it is greater than 25%, a fine crystalline product can hardly be obtained. Therefore the $Na_2O$ content is limited as 10–25%.

$K_2O$ added together with $Na_2O$ has the effect of controlling the rate of crystallization, but a $K_2O$ content of higher than 4% excessively impedes the precipitation of crystals. Therefore the $K_2O$ content is limited to less than 4%.

Furthermore, when the total of the above-mentioned indispensable or essential components is less than 90%, the deformation suffered during the reheating, which is needed for crystallizing the glass, becomes so great that it becomes difficult to transform the shaped product of glass into a semicrystalline ceramic product without changing its shape. Therefore, the total content of the above-mentioned indespensable components is at least 90%.

It is permissable to add small amounts of oxides of divalent metals, for example CaO, BaO and colorant oxides, for example, FeO, CoO, NiO, and MnO by an amount of less than 5% respectively.

Having fully described the invention, what is claimed is:

1. A thermally crystallizable glass having a composition of which at least 90% by weight consists essentially of the following components, present in the glass in the following weight percentages:

| | |
|---|---|
| $SiO_2$ | 35–50 |
| $Al_2O_3$ | 20–35 |
| $Na_2O$ | 10–25 |
| MgO | 3–12 |
| $K_2O$ | 0–4 |
| $ZrO_2$ | 2–6 | wherein the total weight percent of $Na_2O+K_2O$ is from 10–25.

2. The thermally crystallizable glass as defined in claim 1 wherein the remainder of the glass composition has at least one of the following components with the following weight percentages:

| | |
|---|---|
| CaO | 0 to <5 |
| BaO | 0 to <5 |
| Colorant oxide | 0 to <5 |

3. The thermally crystallizable glass as defined in claim 2 wherein the colorant oxide is a member selected from the group consisting of FeO, CoO, NiO and MnO.

4. A thermally crystallizable glass having a composition of which at least 90% by weight consists essentially of the following ingredients, present in the glass in the following weight percentages:

| | |
|---|---|
| $SiO_2$ | 43.1–43.8 |
| $Al_2O_3$ | 26.7–27.2 |
| $Na_2O$ | 14.8–16.7 |
| $ZrO_2$ | 3.4–4.4 |
| MgO | 5.3–10.4 |

5. The glass as defined in claim 4 wherein the remainder of the glass composition has at least one of the following components in the following weight percentages:

| | |
|---|---|
| $K_2O$ | 0–1.6 |
| CaO | 0–2.6 |
| BaO | 0–2.6 |
| FeO | 0–2.2 |

6. A shaped, crystalline ceramic article formed from a pre-formed glass article by thermal in situ crystallization, said glass being a thermally crystallizable glass having a composition of which at least 90% by weight consists essentially of the following ingredients, present in the following weight percent ranges:

| | |
|---|---|
| $SiO_2$ | 35–50 |
| $Al_2O_3$ | 20–35 |
| $Na_2O$ | 10–25 |
| MgO | 3–12 |
| $K_2O$ | 0–4 |
| $ZrO_2$ | 2–6 | wherein the total weight percent of $Na_2O+K_2O$ is from 10–25.

7. The article as defined in claim 6 wherein the composition of the thermally crystallizable glass includes less than 5% by weight of a member selected from the group consisting of CaO, BaO, a colorant metallic oxide, or mixtures thereof.

8. A shaped crystalline ceramic article formed from a pre-formed glass article by thermal in situ crystallization, said glass being a thermally crystallizable glass having a composition of which at least 90% by weight consists essentially of the following ingredients, present in the glass in the following weight percentages:

| | |
|---|---|
| $SiO_2$ | 43.1–43.8 |
| $Al_2O_3$ | 26.7–27.2 |
| $Na_2O$ | 14.8–16.7 |
| $ZrO_2$ | 3.4–4.4 |
| MgO | 5.3–10.4 |

9. The article as defined in claim 8 wherein said glass composition contains at least one of the following members in the amount within the following ranges:

| | |
|---|---|
| $K_2O$ | 0–1.6 |
| CaO | 0–2.6 |
| BaO | 0–2.6 |
| FeO | 0–2.2 |

10. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 35–50 |
| $Al_2O_3$ | 20–35 |
| $Na_2O$ | 10–25 |
| MgO | 3–12 |
| $K_2O$ | 0–4 |
| $ZrO_2$ | 2–6 | wherein the total weight percent of $Na_2O+K_2O$ is from 10–25, forming a shaped glass article from said glass and thereafter thermally crystallizing said shaped article, by in situ crystallization, to a ceramic product having nephelite as its main crystalline phase.

11. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 35–50 |
| $Al_2O_3$ | 20–35 |
| $Na_2O$ | 10–25 |
| $MgO$ | 3–12 |
| $K_2O$ | 0–4 |
| $ZrO_2$ | 2–6 | wherein the total weight percent of $Na_2O+K_2O$ is from 10–25, forming a shaped glass article from said glass, subjecting said article to a temperature above the annealing point and below the softening point of the glass for a period of time sufficient to initiate crystallization of the glass, slowly increasing the temperature of the glass to allow further crystallization of the glass and then maintaining said partially crystallized glass at an elevated temperature until the viscosity of the glass becomes infinite due to the formation of crystals of oxide which constitute the glass.

12. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 35–50 |
| $Al_2O_3$ | 20–35 |
| $Na_2O$ | 10–25 |
| $MgO$ | 3–12 |
| $K_2O$ | 0–4 |
| $ZrO_2$ | 2–6 | wherein the total weight percent of $Na_2O+K_2O$ is from 10–25, forming a shaped glass article from said glass subjecting said article to a temperature above the annealing point and below the softening point of the glass for a period of time sufficient to initiate crystallization of the glass, then increasing the temperature of the glass at a rate of 5° C. per minute to allow further crystallization of the glass and then maintaining said partially crystallized glass at an elevated temperature until a ceramic article is formed.

13. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 35–50 |
| $Al_2O_3$ | 20–35 |
| $Na_2O$ | 10–25 |
| $MaO$ | 3–12 |
| $K_2O$ | 0–4 |
| $ZrO_2$ | 2–6 | wherein the total weight percent of $Na_2O+K_2O$ is from 10–25, forming a shaped glass article from said glass subjecting said article to a temperature above the annealing point and below the softening point of the glass for a period of time sufficient to initiate crystallization of the glass, then increasing the temperature of the glass at a rate of 5° C. per minute to permit further crystallization of the glass and then maintaining the article at a temperature of 900 to 1100° C. until the viscosity of the article becomes infinite and the article is a ceramic.

14. The method as defined in claim 13 wherein the temperature above the annealing point and below the softening point of the glass at which crystallization of the glass is initiated is from 700–800° C.

15. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 35–50 |
| $Al_2O_3$ | 20–35 |
| $Na_2O$ | 10-25 |
| $MgO$ | 3–12 |
| $K_2O$ | 0–4 |
| $ZrO_2$ | 2–6 | wherein the total weight percent of $Na_2O+K_2O$ is from 10–25, forming a shaped glass article from said glass subjecting said article to a temperature above the annealing point and below the softening point of the glass for a period of time sufficient to initiate crystallization of the glass, increasing the temperature of the glass at a rate of 5° C. per minute up to about 1000° C. and then maintaining said article at this temperature for a period of from 1 to 4 hours to form said ceramic article.

16. The method as defined in claim 15 wherein said thermally crystallizable glass contains at least one of the following ingredients within the following weight percent range:

| | |
|---|---|
| $CaO$ | 0 to <5 |
| $BaO$ | 0 to <5 |
| $MnO$ | 0 to <5 |
| $FeO$ | 0 to <5 |
| $CoO$ | 0 to <5 |
| $NiO$ | 0 to <5 |

17. A method for making a crystalline ceramic article which comprises making a thermally crystallizable glass melt having a composition of which at least 90% by weight consists essentially of the following ingredients, present in the glass in the following weight percent ranges:

| | |
|---|---|
| $SiO_2$ | 43.1–43.8 |
| $Al_2O_3$ | 26.7–27.2 |
| $Na_2O$ | 14.8–16.7 |
| $ZrO_2$ | 3.4–4.4 |
| $MgO$ | 5.3–10.4 | forming a shaped glass article from said glass, subjecting said article to a temperature above the annealing point and below the softening point of the glass for a period of time sufficient to initiate crystallization of the glass, increasing the temperature of the glass at a rate of 5° C. per minute up to about 1000° C. and then maintaining said article at this temperature for a period of from 1 to 4 hours to form said ceramic article.

18. The method as defined in claim 17 wherein said thermally crystallizable glass contains at least one of the following ingredients within the following weight percent ranges:

| | |
|---|---|
| $K_2O$ | 0–1.6 |
| $CaO$ | 0–2.6 |
| $BaO$ | 0–2.6 |
| $FeO$ | 0–2.2 |

References Cited

UNITED STATES PATENTS

| | | | |
|---|---|---|---|
| 2,920,971 | 1/1960 | Stookey | 106—39 |
| 3,205,079 | 9/1965 | Stookey | 106—39 |
| 3,313,609 | 4/1967 | Megles | 106—39 |
| 3,241,985 | 3/1966 | Kuwayama | 106—39 |
| 3,146,114 | 8/1964 | Kivlighn | 106—39 |

HELEN M. McCARTHY, Primary Examiner

U.S. Cl. X.R.

65—33; 106—52